United States Patent

[11] 3,569,815

| [72] | Inventor | Lawrence S. McNaughton<br>Crimora, Va. |
|---|---|---|
| [21] | Appl. No. | 747,249 |
| [22] | Filed | July 24, 1968 |
| [45] | Patented | Mar. 9, 1971 |
| [73] | Assignee | General Electric Company |

[54] SERVO DRIVEN TURRET DIRECTION DETERMINATION CONTROL FOR NUMERICAL CONTROL SYSTEM
13 Claims, 2 Drawing Figs.

| [52] | U.S. Cl. | 318/601, 318/664 |
|---|---|---|
| [51] | Int. Cl. | G05b 19/28 |
| [50] | Field of Search | 318/20.300, 20.310, 20.315; 318/20.370 |

[56] References Cited
UNITED STATES PATENTS

| 2,796,566 | 6/1957 | Maynard et al. | 318/(20.315) |
|---|---|---|---|
| 2,823,345 | 2/1958 | Ragland et al. | 318/(20.310X) |
| 3,127,587 | 3/1964 | Rasmussen et al. | 318/(20.310X) |
| 3,243,780 | 3/1966 | Bendick et al. | 318/(20.310X) |
| 3,333,089 | 7/1967 | Saylor et al. | 318/(20.310X) |
| 3,399,753 | 9/1968 | Revelle | 318/(20.315X) |
| 3,439,336 | 4/1969 | Toifl et al. | 318/(20.320X) |

Primary Examiner—T. E. Lynch
Attorneys—Lawrence G. Norris, Michael Masnik, Stanley C. Corwin, Frank L. Neuhauser, Oscar B. Waddell and Melvin M. Goldenberg ABSTRACT: A numerical control system for a numerically controlled endless recirculated and reversible machine tool of the rotatable turret type having a plurality of discrete working positions. The numerical control system comprises command data input equipment for reading in command data relating to new working positions for the numerically controlled machine tool turret. A machine tool position comparator circuit is controlled by the command data input equipment and with feedback signals representative of the actual position of the machine tool turret being controlled. The machine tool position comparator circuit serves to compare the actual position of the machine tool being controlled to a commanded new position and for deriving an output control signal indicative of any difference for use in driving the machine tool turret to the commanded new position. A machine tool motor control circuit is controlled by using the output error control signal developed by the comparator circuit and drives the machine tool turret to its commanded new position. A direction determining control circuit has an input coupled to the output from the command data input equipment for determining the optimum direction for running the machine tool turret in order to obtain the commanded new position for the turret with minimum movement. The direction determining control circuit derives output directional control signals which are indicative of the optimum direction to be moved and which are supplied to the machine tool turret motor control circuit for controlling the direction in which the motor control circuit rotates the machine tool turret in the optimum direction to its commanded new position with minimum movement.

SERVO DRIVEN TURRET DIRECTION DETERMINATION CONTROL FOR NUMERICAL CONTROL SYSTEM

BACKGROUND OF INVENTION

1. Field of Invention

This invention relates to numerical contour control systems and to a new and improved direction determining control for use in such systems.

More particularly, the invention relates to a new and improved direction determining control for numerical control systems which decides, in advance of any change, the proper direction of rotation for a reversibly rotatable machine tool turret having a plurality of discrete working positions, and which sets the machine tool turret motor control circuit directionally so that the shortest rotational movement is made by the turret during relocation to a new working position in response to new command data input.

2. Prior Art Problem

There are a number of numerical contouring control systems for automatically controlled machine tools available in the art. These numerical control systems are of the type that automatically position a tool holding turret with respect to an article being worked (workpiece) or vice versa. As an example of such a known numerical control system, reference is made to U.S. Pat. No. 3,120,603 issued Feb. 4, 1964—J. E. Jones—inventor, for an "Automatic Control Apparatus" - assigned to the General Electric Company. In many of the existing numerically controlled machine tools, a tool holding turret is provided with a number of working positions or stations at which it can be placed relative to the workpiece, and may be reversibly rotated to any one of these plurality of working stations by the numerical control system in response to new input command data read into the system by suitable data input equipment such as a magnetic tape reader, a punched tap reader, a punched car reader, etc. In numerical control systems automatically controlling such tools, often it is desirable to utilize data input equipment employing a memory storage and readout device such as a magnetic tape reader on which part patterns are stored in conjunction with a second, separate program magnetic tape reader. The second, separate program magnetic tape reader is employed to call up particular part patterns from the memory tape at selected points in the overall machining program to be conducted by the numerically controlled machine tool; however, the selected points are entirely random with respect to the order of arrangement of the part patterns on the memory tape.

In arrangements such as that described above, there is no practical way in which to predetermine in the memory tapes storing the part patterns, the proper direction of rotation of the tool turret for each selected part pattern since the part patterns are to be called out in a random fashion as determined by the program tape. It is desirable, however, that the tool turret always be rotated in a direction to require the shortest travel in placing the turret in a new commanded working position relative to the workpiece. To overcome this problem, the present invention was devised.

SUMMARY OF INVENTION

It is therefore a primary object of the invention to provide a new and improved numerical control system for automatically controlled processes which includes a new and improved direction determining control for optimizing the direction of operation effected by the numerical control system.

Another object of the invention is to provide a new and improved direction determining control for numerical control systems which decides, in advance of any change, the proper direction for change (such as rotation of a reversibly rotatable machine tool turret having a plurality of work stations), in order to effect the change with minimum effort as by positioning the turret at a commanded new work station with a minimum of rotational movement.

In practicing the invention, a numerical control system is provided for a numerically controlled, endless, recirculated and reversible process of the type having a plurality of discrete working conditions such as is exemplified by a reversibly rotatable machine tool turret. The numerical control system comprises command data input equipment for reading in command data relating to new working conditions for the numerically controlled process. A process working condition comparator circuit means is provided having a first input coupled to the output from the command data input equipment and has a second input supplied with feedback signals representative of the actual condition of the process being controlled, such as the actual position of a machine tool turret. The process working condition comparator circuit means serves to compare the condition of the process being controlled to a commanded new condition, and to derive an output control signal indicative of any difference. Process control manipulator means (such as a machine tool motor control circuit) is included having an input coupled to the output of the process working condition comparator circuit means for controlling the condition of the process. The system is completed by direction determining control circuit means having an input coupled to the output from the command data input equipment for determining in advance of any change the optimum direction for changing the process in order to obtain a commanded new condition with minimum change, and for deriving output directional control signals indicative of the direction in which the change is to be made. The directional control signal is supplied to the input of the process control manipulator means (such as a machine tool turret motor control circuit) for controlling the direction in which the process (machine tool) is moved to a commanded new position.

The direction determining control for the numerical control system comprises a process condition simulator counter means for simulating the plurality of discrete working conditions of the process such as for example simulating the plurality of discrete working conditions of a machine tool turret. Direction determining comparator means are provided having a first input coupled to the output from the process condition simulator counter means, which output is representative of an existing working condition of the process. Means are provided for coupling input data command signals to a second input of the direction determining comparator means for supplying thereto input data command signals representative of a commanded new working condition for the process, such as a commanded new working position for the machine tool turret. The direction determining comparator means serves to compare a commanded new working condition for the process to the existing condition as represented by the output from the process condition simulator counter means, and derives output signals for use in controlling the process so that it assumes the commanded new working condition. The output from the comparator means is also supplied simultaneously to the process condition simulator counter means for adjusting its count to simulate changes of the process to the commanded new working condition. In the example cited, the process condition simulator counter means count will simulate, in advance of movement, the change in position of the machine tool turret. A resettable simulated conditions changed counter means is provided having a first input coupled to the output from the direction determining comparator means for recording the number of simulated conditions to be changed (number of working stations to be changed) as a consequence of each commanded change in working conditions of the process. The resettable simulated conditions changed counter means includes logic circuit means for comparing the number of commanded working conditions (stations) to be changed to a total number of possible discrete working conditions (stations) to which the process can be changed and for deriving a first directional output control signal for changing the process in a first direction when the number of working conditions to be changed is greater than one-half the total number of discrete working conditions (stations) of which the process is capable. This logic circuit means also derives a second directional output control signal for changing the process in the opposite direction where the number of conditions to be changed is less than one-half the total number of discrete process working conditions (stations). Means are also provided for resetting the resettable simulated conditions changed counter means to zero upon each placement of the process into a new working condition.

In a preferred embodiment of the invention, the numerical control system includes delay means for delaying operation of the process control manipulator means in changing the process to a commanded new condition for a period sufficient to allow the direction determining control circuit means to determine and set the direction in which the process control manipulator ma means controls the change in condition to the commanded new condition. Additionally, the direction determining comparator means in the direction determining control circuit is designed to discontinue the supply of count adjusting signal pulses to the process condition simulator counter and to the resettable simulated conditions changed counter upon the process condition simulator counter means being counted to a condition corresponding to the commanded new working condition as determined by the input data command, and concurrently derives an output start enabling signal indicative of this condition. This output start enabling signal is supplied to the resettable simulated conditions changed counter means as an indication to the logic circuit means comprising a part thereof that a direction determination is to be initiated. The output start enabling signal derived by the direction determining comparator means is also supplied through the delay means to the process control manipulator means (machine tool turret motor control circuit) to initiate its operation subsequent to the direction setting thereof by the directional control signals derived by the direction determining control circuit means.

DESCRIPTION OF THE DRAWINGS

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENT

Figure 1:
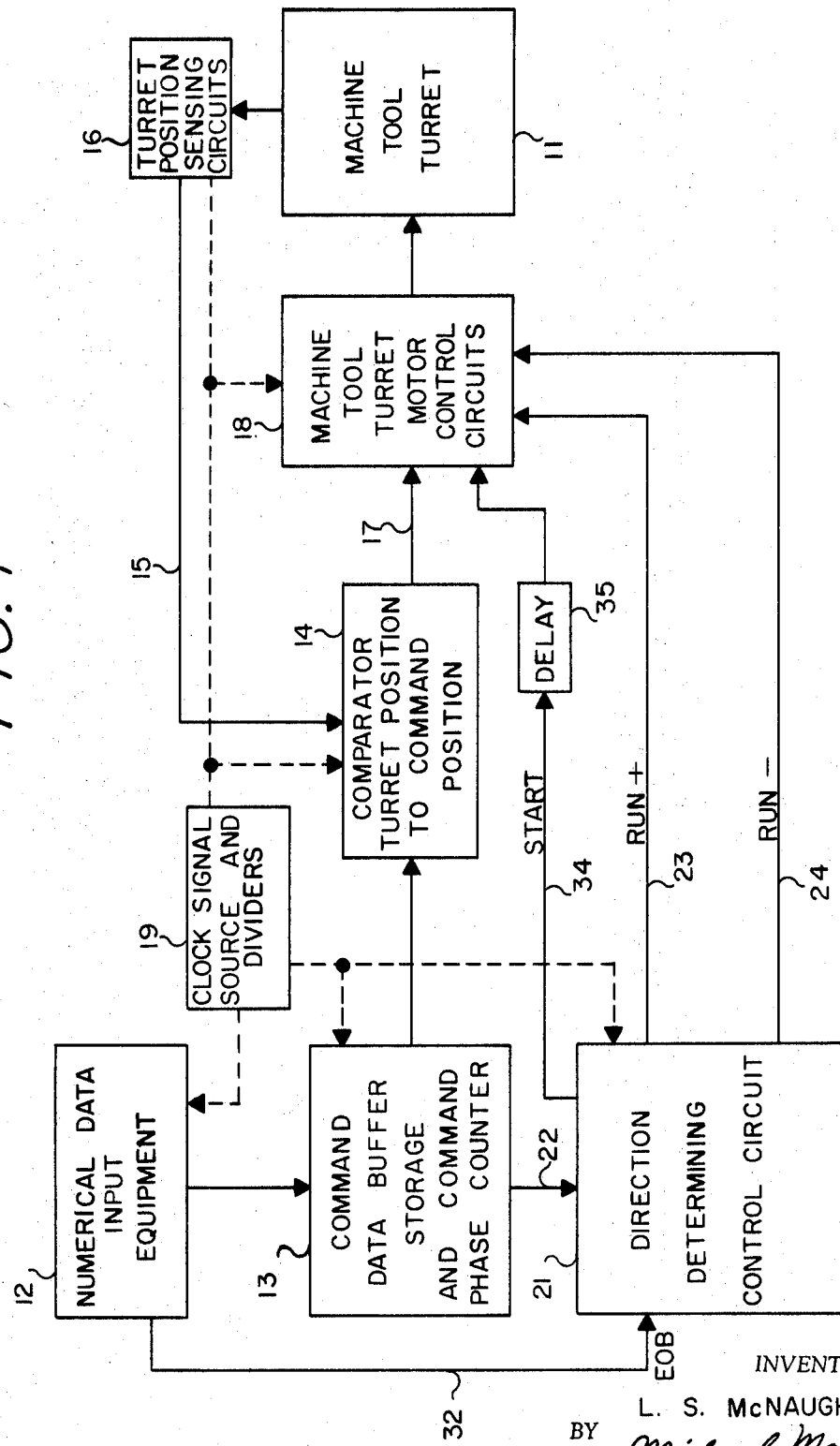
FIG. 1 is a functional block diagram of a new and improved numerical control system constructed in accordance with the invention and including a direction determining control circuit as a part thereof.

FIG. 1 is a functional block diagram of a new and improved numerical control system for an automatic machine tool constructed in accordance with the invention. The particular numerical control system shown in FIG. 1 is designed for use with an endless recirculated and reversible machine tool of the rotatable turret type which has a plurality of discrete working positions. The machine tool turret is shown schematically at 11 and preferably comprises a rotatable tool holding assembly which can be rotated in either direction to place a tool working head (such as a drill bit) in any selected one of a plurality of different working locations or positions. It should be expressly understood, however, that while a rotatable tool turret assembly has been mentioned, the invention applies equally well to machine tools of the type where the article being worked on (workpiece) is suitably positioned by a rotatable and reversible work table with respect to a stationary tool head, etc. Accordingly, while the following description will be directed to a rotatable machine tool turret which which can be continuously rotated in an endless recirculated fashion, and can be reversed, the control may be applied to any similar machine tool processing the endless recirculated and reversible post positioning capability such as might be accomplished with an endless chain drive, etc. Additionally, while the invention is to be described with relation to a particular type of machine tool, in its broadest aspects, it is applicable to any type of numerical control system for controlling an endless recirculated and reversible process having a plurality of discrete process working conditions which occur serially and which can be uniquely identified.

The numerical control system according to the invention shown in FIG. 1 is comprised by command data input equipment shown generally at 12 and which includes magnetic tape readers, punched tape readers, etc. together with appropriate signal processing circuitry for processing and supplying suitable command data input signals to a command data buffer storage and command phase counter 13. The command data input signal derived from unit 13 is supplied to machine tool position comparator circuit means shown at 14 that also has a second feedback signal supplied to a second input terminal thereof over a conductor 15 from a machine tool turret position sensing circuit means shown at 16. The machine tool position comparator circuit means 14 serves to compare the actual position of the machine tool turret being controlled as measured by sensing circuits 16 to a commanded new position for the turret as indicated by the command data input signals applied thereto from the command data input unit 13, and to derive an output control signal which is indicative of any difference.

The output control signal developed by comparator 14 is supplied over a conductor 17 to the input of a machine tool turret motor control circuit 18 of conventional construction for causing the motor control circuit 18 to drive the machine tool turret 11 in a manner to reduce the error output signal supplied from comparator circuit 14 over conductor 17 to zero. All of the circuits 12 through 18 and their associated interconnections are conventional, digitally operable, pulsed electric circuits operating in a binary coded, decimal logic to achieve control over the movement of the machine tool turret 11. In order to properly time and synchronize clocking in and clocking out of the digitized signals to and from the several elements of the circuit, a clock signal source and associated suitable dividers is provided as shown at 19, and is interconnected to all of the several elements of the numerical control system as indicated by the dotted line connections.

Since the construction and operation of digitally operable, timed and synchronized, binary coded, decimal numerical control systems is well-known in the art, as exemplified by the above reference U. S. Pat. No. 3,120,603, a further detailed description of the construction and operation of the elements of the system is believed unnecessary. For example, the machine tool turret motor control circuit 18 may be comprised by a conventional servo amplifier supplied from a digital to analogue converter that in turn is driven by the output from comparator 14. The turret positioning sensing circuit may be comprised by a position feedback synchro-resolver and associated wave-shaping circuitry, and would be driven by movement of the machine tool turret 11 to generate position indicating signals that can be fed back over the conductor 15 to the comparator 14. The comparator 14 may comprise a comparator circuit such as the Y axis phase discriminator (comparator) described in the above patent. It should be noted at this point that the functional system illustrated in FIG. 1 is intended to depict any form of single axis, dual axis or three axis machine tool control such as that shown in U.S. Pat. No. 3,120,603, and is in no way restricted to movement and control along only a single directional axis.

The numerical control system shown in FIG. 1 as thus far described is conventional, an and will operate satisfactorily for many purposes to position the machine tool turret 11 at selectively commanded new working positions in accordance with input command data supplied by the numerical data input equipment 12. However, with nothing further the system will generally step the machine tool turret 11 (which is rotatable and hence capable of being endlessly recirculated) in only one direction to appropriately position it in a manner to reduce the output error signals supplied over the conductors 17 from the output of comparator 14 to zero thereby stopping further movement of the machine tool turret since upon this occasion it will be properly positioned in accordance with the input command data supplied to comparator 14 from the numerical data input equipment. It should be noted, however, that should the machine tool turret have some finite number of working stations, such as 36 different working stations, and is presently positioned at, for example, station number 35, then if the machine is commanded to move the turret to station 33 for example, the system as thus far described would step the turret from position 35 in the forward direction all the way around through stations 36 and 1 through 32 to position it at station 33. A much more direct, and hence preferable manner of positioning the turret would be to reverse its direction of rotation step it two positions from station 35 to station 33.

In order ti to accomplish the desired reversing of the connection of the machine tool turret motor control circuits 18 so as to backstep the machine tool turret under conditions such as those noted in the above-cited example, the numerical control system of FIG. 1 further includes direction determining control circuit means 21. The direction determining control circuit means 21 has one input coupled to the data output from the command data input equipment as shown by the conductor 22 for supplying information pertaining to the commanded new position for the machine tool turret to the direction determining control circuit means 21. The direction determining control circuit means 21 then makes a quick calculation by comparing an input commanded new position for the machine tool turret 11 to the existing position of the turret (as determined from a simulated memory comprising a part of the direction determining control circuit), and to derive an output directional control signal that is supplied over either a conductor 23 or a conductor 24 to the machine tool motor control circuit 18, and is indicative of the direction in which the machine tool turret 11 is to be moved in order to position the machine tool turret at the commanded new position with minimum movement.

Figure 2:
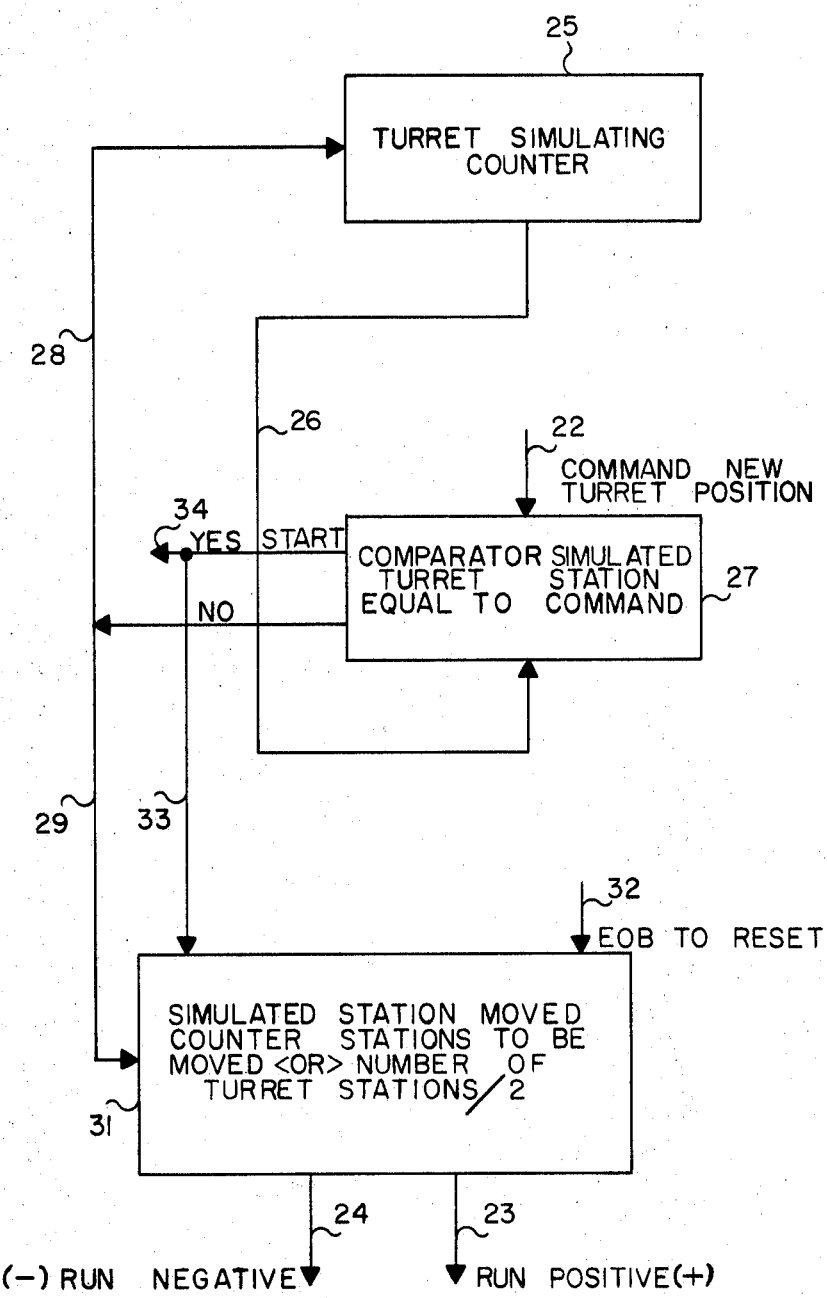
FIG. 2 is a functional block diagram of a new and improved direction determining control circuit for use in numerical control systems constructed in accordance with the invention.

FIG. 2 is a functional block diagram showing the construction of the direction determining control circuit 21. As shown in FIG. 2, the direction determining control circuit comprises a machine tool turret position simulator counter 25 for simulating the plurality of discrete working o positions of the machine tool turret. The turret simulating counter 25 supplies its output count signal over a conductor 26 to one input of a direction determining comparator circuit means 27. The output signal supplied from turret simulating counter 25 over conductor 26 to direction determining comparator 27 represents the existing working position of the machine tool turret, and was set into the turret simulating counter 25 as a consequence of a previous cycle of operation. The input data command signal supplied from the numerical data input equipment over the conductor 22 is applied to a second input terminal of the direction determining comparator 27, and is representative of a commanded new working position for the machine tool turret. The direction determining comparator circuit means 27 serves to compare a commanded new working position for the machine tool as represented by the data input signal supplied over the conductor 22 to the existing position as represented by the output from the machine tool turret position simulator counter 25 supplied over the conductor 26.

During operation, the direction determining comparator 27 will compare the two signals supplied to its input, and will derive output trigger signal pulses for use in driving the machine tool to the commanded new working position. For so long as the commanded new input position is different from the position indicated by the turret simulating counter 25, the direction determining comparator 27 will derive "no" output trigger signal pulses that are supplied over a conductor 28 back to an input of the machine tool turret position simulating counter 25 to adjust its count to simulate movement of the machine tool turret to the commanded new working position. The output "no" trigger signal pulses from direction determining comparator 27 are also supplied over a conductor 29 to the input of a resettable simulated stations moved counter means 32 for recording the number of simulated stations moved as a consequence of each commanded change in working position of the machine tool. The simulated stations moved counter 31 is a resettable counter, and is reset to zero at the end of each placement of the machine tool turret by an end of block trigger signal supplied to a second input of counter 31 over a conductor 32 from the numerical input data equipment 12 as illustrated in FIG. 1. From this brief description, it will be appreciated that for so long as the count in the turret simulating counter 25 differs from the count supplied to direction determining comparator 27 as representative of the commanded new machine tool turret position, the comparator 27 will derive output "no" trigger signal pulses that are supplied over conductor 28 to count turret simulating counter 25 to a condition where its count equals that of the commanded new turret position. The pulses also are supplied over conductor 29 to count up the simulated stations moved counter 31 which previously had been reset to zero. Thus, it will be appreciated that the simulated stations moved counter 31 at the point where the count stored in the turret simulating counter 25 equals the count representing the commanded new turret position, will represent the total number of stations that will have to be moved by the machine tool turret to attain its commanded new position.

The resettable simulated stations moved counter means 31 also includes logic circuit means for comparing the number of commanded work positions to be moved to the total number of discrete working positions to which the machine tool turret can be moved. For this purpose, the simulated stations moved counter means 31 may include a preset counter on which the total number of available work positions to which the machine tool turret 11 can be set, is recorded, together with a suitable comparator circuit for comparing this preset number to the number of commanded working positions to be moved count applied over the conductor 29. The logic circuit means contained in the simulated stations moved counter then operates to derive directional output signals which are indicative of the direction in which the machine tool turret 11 should be moved to reach its commanded new position with minimum movement. In the event that the number of working positions to be moved is greater than one half the total number of discrete working positions to which the machine tool turret 11 can be moved, the logic circuit means associated with simulated stations moved counter 31 will derive a first directional output control signal for running the machine tool in a first direction (for example the negative direction) and which is supplied over the conductor 24 to the machine tool turret motor control circuit 18. In the event that the number of working positions to be moved is equal to or less than one half the total number of discrete machine tool working positions to which the machine tool turret 11 can be moved, a second directional output control signal is derived for running the machine tool turret 11 in the opposite direction (for example the positive direction) and is supplied over the conductor 23 to the machine tool turret motor control circuits.

From the above description, it will be appreciated that the turret simulating counter 25 functions to simulate movement of the machine tool turret 11 in advance of actual movement of the turret by the machine tool turret motor control circuit 18. As a consequence of a previous cycle of operation, the turret simulating counter 25 will contain a count which is representative of the actual position of the machine tool turret. A count representative of a commanded new position for the machine tool turret is supplied to the direction determining comparator 27, and the turret simulating counter 25 is counted up until the number in counter 25 equals the count in the comparator representative of the commanded new turret position. While this was going on, the second simulated stations moved resettable counter 31, that started from the reset or zero state was counted up in rhythm with the turret simulating counter 25 in a manner which corresponds to moving the machine tool turret in a positive direction. The turret simulating counter 25 is never reset so that each time a new tool working position is called for, it has recorded the old one. Subsequent to this counting up action, if the second simulated stations moved counter has a number equal or less than the number of total machine tool turret positions divided by 2, the turret will be commanded to run in a first (positive) direction by the output signal supplied over conductor 23. In the event that the count accumulated in simulated stations moved counter 31 has a number greater than the number of turret positions available divided by 2, then the machine tool turret will be commanded to run in a second (negative) direction by the signal supplied over the conductor 24. This determination process requires some finite time (approximately 400 microseconds) and takes place just after the commanded new tool information is read into comparator 27 and just after mechanical motion takes place.

In order to signal the logic circuit means in simulated stations moved counter 31 that a determination should be made, the direction determining comparator circuit means 27 discontinues the supply of count adjusting signal pulses over the conductors 28 and 29, and provides a "yes-start" enabling signal over a conductor 33 to the resettable simulated stations moved counter means 31 as an indication to the logic circuit means that a direction determination should be initiated. Simultaneously, this "yes-start" enabling signal is supplied over a conductor 34 through a suitable delay means 35 to the machine tool turret motor control circuits 18. The delay means 35 functions to delay operation of the machine tool motor control circuit means 18 for a period of time sufficient to allow the direction determination to be made by control circuit 21 and to set the direction in which the machine tool motor control circuit 18 will drive the machine tool turret motor 11 to the commanded new position. If desired, this delay could be designed into the direction determining control circuit or could be incorporated into the machine tool turret motor control circuit 18. With respect to the design of the turret simulating counter 25 employed in the direction determining control circuit 21, this counter may comprise a counter such as that shown in FIG. 17 of U. S. Pat. No. 3,120,603. The direction determining comparator 27 may comprise a comparator circuit such as that shown in FIG. 12 of the patent, and the simulated stations moved counter 31 may comprise any suitable form of a resettable counter such as that shown in FIG. 17 of the patent together with conventional logic circuits for performing the necessary logic comparison and deriving the run + and run − directional output control signal supplied over conductors 23 and 24 to the machine tool turret motor control circuit 18.

In operation, the numerical control system shown in FIG. 1 functions in the following manner. It is assumed that the machine tool turret 11 is preset at one of its established working positions which previously has been supplied back through the turret position sensing circuit 16 to the turret position comparator 14. At this point it should be remembered that the turret simulating counter 25 also has stored in it a counter which is indicative of the simulated position of the machine tool turret 11. Under these conditions, a commanded new position is read into the system by the numerical data input equipment and command data buffer storage 13. This commanded new position is supplied both to comparator 14 and to the direction determining control circuit 21. At this point, the comparator 14 will make it determination that the machine tool turret 11 has to be moved, and will supply enabling output signals to the machine tool motor control circuits 18 for moving the machine tool turret 11 so as to reduce the error in the count provided by the turret position sensing circuit 16 and the count provided by the numerical data input equipment to a zero value. This output control signal; however, is not effective to operate the machine tool turret motor control circuits 18 until an enabling potential is supplied thereto from the direction determining control circuit 21 over conductor 34 and through the delay means 35. This will not occur however until such time that the direction determining control circuit 21 has functioned in the above-described manner to derive the output directional control signal supplied over either conductor 23 or conductor 24 to set the direction in which the machine tool turret motor control circuit will run the machine tool turret motor 11. Thus, after the motor control circuit 18 has been set by the directional output control signal supplied over conductor 23 or 24, the "yes-start" enabling signal will be supplied through the delay means 35 to enable the machine tool turret motor control circuit to commence moving the machine tool turret mechanically so as to position the turret at its commanded new position. As a consequence of the prior direction determination made by the direction determining control circuit 21, the turret will have to be moved only a minimum distance thereby negating the possibility of having to be rotated through a distance of more than one half of its total travel. In this manner, considerable efficiency in the operation of the machine tool is achieved.

From the foregoing description it will be appreciated therefore that the invention provides a new and improved numerical control system for automatically controlled processes which includes a new and improved direction determining control for optimizing the direction of operation effected by the control. The invention also makes available a new and improved direction determining control for numerical control systems which decides, in advance of any change, the proper direction for the change to be made as for example the proper direction for rotation of a reversibly rotatable machine tool turret having having a plurality of work stations, in order to position the turret at a commanded new work station with a minimum of rotational movement.

Having described one embodiment of a numerical control system and direction determining control therefore constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

I claim:

1. An optimum direction determining system for positioning a rotary turret at a plurality of turret positions around its path of rotary movement comprising a first counter for storing a number representative of a turret position, a source of a commanded new position number, means for comparing both of said aforementioned numbers and responsive to said comparison indicating a difference for initiating counting pulses to cause said first counter to count in a predetermined direction until said compared numbers are in agreement, a second counter, said second counter responsive to said counting pulses to cause said second counter to count in a predetermined direction, means responsive to the count in said second counter not exceeding a number representative of a first portion of the total number of said turret positions to indicate a first direction of rotary movement, and means responsive to the count in said second counter exceeding a number representative of a second portion of the total number of said turret positions to indicate a second direction of rotary movement.

2. A direction determining system for a rotary turret positionable at a plurality of turret positions around its path of rotary movement comprising a first counter for storing a number representative of a given turret position, a second counter, a source of a commanded position signal, means responsive only to a difference in the positions represented by said number and said signal for initiating counting pulses to cause said first and second counters to count until the positions represented by said signal and stored number are in are agreement, means responsive to the count in said second counter not exceeding a given number to indicate a first direction of rotary movement, and means responsive to the count in said second counter exceeding a given number to indicate a second direction of rotary movement.

3. An optimum direction determining system for positioning a rotary turret at a plurality of turret positions around its path of rotary movement comprising a first counter for storing a number representative of a turret position, a source of a commanded new position number, means for comparing both of said aforementioned numbers to obtain a comparison signal, means responsive to said comparison signal indicating a difference in said first-mentioned numbers for initiating counting pulses to cause said first counter to count in a predetermined direction until said compared numbers are in agreement, a second counter, said second counter normally being reset to a given state, said second counter also responsive to said counting pulses to cause said second counter to count in a predetermined direction in synchronism with the counting of said first counter, means responsive to the count in said second counter not exceeding a number representative of half of the total number of said turret positions to indicate a first direction of rotary movement, and means responsive to the count in said second counter exceeding a number representative of half of the total number of said turret positions to indicate the other direction of rotary movement.

4. An optimum direction determining system for positioning a rotary turret at a plurality of turret positions around its path of rotary movement comprising a first counter for continuously storing a number representative of a last turret position, a source of a commanded new turret position number, means for comparing both of said aforementioned numbers to obtain a comparison signal, means responsive to said comparison signal indicating a difference in said first-mentioned numbers for initiating counting pulses, said first counter responsive to said counting pulses to count in one direction until said compared numbers are in agreement, a second counter, said second counter also responsive to said counting pulses to cause said second counter to count in one direction in synchronism with the counting of said first counter, means responsive to the count in said second counter not exceeding a number representative of half of the total number of said turret positions to indicate a first direction of rotary movement, means responsive to the count in said second counter exceeding a number representative of half of the total number of said turret positions to indicate the other direction of rotary movement, and means for resetting said second counter to a zero state for the next comparison of numbers.

5. A direction determining control for a numerical control system of the type controlling an endless recirculated and reversible machine tool having a plurality of discrete working positions comprising machine tool position simulator counter means for simulating the plurality of discrete working positions of the machine tool, comparator means having a first input coupled to an output from said machine tool position simulator counter means which is representative of an existing working position of the machine tool, means for coupling input data command signals to a second input of said comparator means for supplying thereto input data command signals representative of a commanded new working position for the machine tool, said comparator means serving to compare a commanded new working position for the machine tool to the existing position as represented by the output from the machine tool position simulator counter means and to derive output signals for use in driving the machine tool to the commanded new working position and for simultaneous application to the machine tool position simulator counter means for adjusting its count to simulate movement of the machine tool to the commanded new working position, resettable simulated stations moved counter means having a first input coupled to the output from the comparator means for recording the number of simulated stations to be moved as a consequence of each commanded change in working position of the machine tool, the resettable simulated stations moved counter means including logic circuit means for comparing the number of commanded work positions to be moved to the total number of discrete working positions to which the machine tool can be moved and for deriving a first directional output control signal for running the machine tool in a first direction where the number of o working positions to be moved is greater than one half the total number of discrete working positions to which the machine tool can be moved, and for deriving a second directional output control signal for running the machine tool in the opposite direction where the number of positions to be moved is less than one half the total number of discrete machine tool working positions, means for resetting the resettable simulated stations moved counter means to zero upon each placement of the machine tool into a new working position, said comparator means discontinuing the supply of count adjusting signals to the machine tool position simulator counter means and to the resettable simulated stations moved counter means upon the machine tool position simulator counter means being counted to a condition corresponding to the commanded new working position as determined by the input data command and concurrently deriving an output start enabling signal indicative of this condition for use in the further operation of the control, said output start enabling signal derived by the comparator means upon the count in the machine tool position simulator counter means corresponding to the commanded new position being supplied to the resettable simulated stations moved counter means as an indication to the logic circuit means comprising a part thereof that a direction determination is to be initiated, said direction determining control being digitally operable and further including means for supplying synchronizing clock signal pulses to the machine tool position simulator counter means, the comparator means and the simulated stations moved counter means for synchronizing the operation thereof with a digitally operable numerical control system with which the control is to be used.

6. A numerical control system for a numerically controlled endless recirculated and directionally reversible machine tool turret of the type having a plurality of discrete working positions, said numerical control system comprising command data input equipment for reading in command data relating to new working positions for the numerically controlled machine tool turret, machine tool position comparator circuit means having a first input coupled to the output from the command data input equipment and having a second input supplied with signals representative of the last actual rotary position of the machine tool turret being controlled, the machine tool turret position comparator circuit means serving to compare the last actual position of the machine tool turret being controlled to a commanded new position and for deriving an output control signal indicative indicative of any difference, machine tool motor control circuit means having an input coupled to the output from the machine tool position comparator circuit means for controlling the position of the machine tool turret, direction determining control circuit means having an input coupled to an output from the command data input equipment for determining the optimum direction for running the machine tool turret in order to obtain a commanded new position with minimum movement and for deriving output directional control signals indicative of the direction to be moved, the directional control signals derived by the direction determining control circuit means being coupled to an input of the machine tool motor control circuit means for controlling the direction in which the machine tool turret is moved to a commanded new position, and delay means for delaying operation of the machine tool motor control circuit means in positioning the machine tool turret to a commanded new position for a period sufficient to allow the direction determining control circuit means to determine and set the direction in which the machine tool motor control circuit means controls movement of the machine tool turret to the commanded new position.

7. A numerical control system for a numerically controlled endless recirculated and directionally reversible machine tool turret of the type having a plurality of discrete working positions, said numerical control system comprising command data input equipment for reading in command data relating to new working positions for the numerically controlled machine tool turret, machine tool position comparator circuit means having a first input coupled to the output from the command data input equipment and having a second input supplied with signals representative of the last actual rotary position of the machine tool turret being controlled, the machine tool turret position comparator circuit means serving to compare the last actual position of the machine tool turret being controlled to a commanded new position and for deriving an output control signal indicative of any difference, machine tool motor control circuit means having an input coupled to the output from the machine tool position comparator circuit means for controlling the position of the machine tool turret, direction determining control circuit means having an input coupled to an output from the command data input equipment for determining the optimum direction for running the machine tool turret in order to obtain a commanded new position with minimum movement and for deriving output directional control signals indicative of the direction to be moved, the directional control signals derived by the direction determining control circuit means being coupled to an input of the machine tool motor control circuit means for controlling the direction in which the machine tool turret is moved to a commanded new position, said direction determining control circuit means comprising machine tool turret position simulator counter means for simulating the plurality of discrete working positions of the machine tool, direction determining comparator means having a first input coupled to an output from said machine tool turret position simulator counter means which is representative of an existing working position of the machine tool, means for coupling input data command signals to a second input of said direction determining comparator means for supplying thereto input data command signals representative of a commanded new working position for the machine tool turret, said direction determining comparator means serving to compare a commanded new working position for the machine tool turret to the existing position as represented by the output from the machine tool position simulator counter means and to derive output signals for use in driving the machine tool turret to the commanded new working position and for simultaneous application to the machine tool turret position simulator counter means for adjusting its count to simulate movement of the machine tool turret to the commanded new working position, resettable simulated stations moved counter means having a first input coupled to the output from the direction determining comparator means for recording the number of simulated stations to be moved as a consequence of each commanded change in working position of the machine tool turret, the resettable simulated stations moved counter means including logic circuit means for comparing the number of commanded work positions to be moved to the total number of discrete working positions to which the machine tool turret can be moved and for deriving a first directional output control signal for running the machine tool turret in a first direction where the number of working positions to be moved is greater than one half the total number of discrete working positions to which the machine tool turret can be moved, and for deriving a second directional output control signal for running the machine tool turret in the opposite direction where the number of positions to be moved is less than one half the total number of discrete machine tool turret working positions, and means for resetting the resettable simulated stations moved counter means to zero upon each placement of the machine tool turret into a new working position.

8. A numerical control system according to claim 7 further including delay means for delaying operation of the machine tool motor control circuit means in positioning the machine tool to a commanded new position for a period sufficient to allow the direction determining control circuit means to determine and set the direction in which the machine tool motor control circuit means controls movement of the machine tool to the commanded new position.

9. A numerical control system according to claim 8 wherein the direction determining comparator means in the direction determining control circuit means discontinues the supply of count adjusting signals to the machine tool position simulator counter means and to the resettable simulated stations moved counter means upon the machine tool position simulator counter means being counted to a condition corresponding to the commanded new working position as determined by the input data command and concurrently derives an output start enabling signal indicative of this condition, means for supplying the output start enabling signal derived by the direction determining comparator means to the resettable simulated stations moved counter means as an indication to the logic circuit means comprising a part thereof that a direction determination is to be initiated, and means for supplying the output start enabling signal derived by the direction determining comparator means through the delay means to the machine tool motor control circuit means to initiate its operation subsequent to the direction setting thereof by the directional control signals derived by the direction determining control circuit means.

10. A numerical control system according to claim 9 wherein the system is digitally operable and further including means for supplying synchronizing clock signal pulses to the constituent parts of the system for timing and synchronizing the operation thereof, and wherein an end of block signal is derived by the command data input equipment at the end of each block of input data to identify the completion of input data command instructions relating to each new commanded position for the machine tool, and means for supplying the end of block signal to the resettable simulated stations moved counter means as the means for resetting this counter to zero upon each placement of the machine tool into a new working position.

11. A numerical control system for a numerically controlled endless recirculated and reversible process of the type having a plurality of discrete working conditions, said numerical control system comprising command data input equipment for reading in command data relating to new working conditions for the numerically controlled process, process working condition comparator circuit means having a first input coupled to the output from the command data input equipment and having a second input supplied with signals representative of the actual condition of the process being controlled, the process working condition comparator circuit means serving to compare the condition of the process being controlled to a commanded new condition and for deriving an output control signal indicative of any any difference, process control manipulator means having an input coupled to the output from the process working condition comparator circuit means for controlling the condition of the process, direction determining control circuit means having an input coupled to an output from the command data input equipment for determining the optimum direction for changing the process in order to obtain a commanded new condition with minimum change and for deriving output directional control signals indicative of the direction the process is to be changed, the directional control signals derived by the direction determining control circuit means being coupled to an input of the process control manipulator means for controlling the direction in which the process is changed to a commanded new condition, said direction determining control circuit means comprising process condition simulator counter means for simulating the plurality of discrete working conditions of the process, direction determining comparator means having a first input coupled to an output from said process condition simulator counter means which is representative of an existing working condition of the process, means for coupling input data command signals to a second input of said direction determining comparator means for supplying thereto input data command signals representative of a commanded new working condition for the process, said direction determining comparator means serving to compare a commanded new working condition for the process to the existing condition as represented by the output from the process condition simulator counter means and to derive output signals for use in controlling the process so that it assumes the commanded new working condition and for simultaneous application to the process condition simulator counter means for adjusting its count to simulate changes of the process to the commanded new working condition, resettable simulated conditions changed counter means having a first input coupled to the output from the direction determining comparator means for recording the number of simulated conditions to be changed as a consequence of each commanded change in working conditions of the process, the resettable simulated conditions changed counter means including logic circuit means for comparing the number of commanded working conditions to be changed to total number of discrete working conditions to which the process can be changed and for deriving a first directional output control signal for changing the process in a first direction where the number of working conditions to be changed is greater than one half the total number of discrete working conditions of which the process is capable, an and for deriving a second directional output control signal for changing the process in the opposite direction where the number of conditions to be changed is less than one half the total number of discrete process working conditions, and means for resetting the resettable simulated conditions changed counter means to zero upon each placement of the process into a new working condition.

12. A numerical control system according to claim 11 further including delay means for delaying operation of the process control manipulator means in changing the process to a commanded new condition for a period sufficient to allow the direction determining control circuit means to determine and set the direction in which the process control manipulator means controls the change in condition to the commanded new condition.

13. A numerical control system according to claim 12 wherein the direction determining comparator means in the direction determining control circuit means discontinues the supply of count adjusting signals to the process condition simulator counter means and to the resettable simulated conditions changed counter means upon the process condition simulator counter means being counted to a condition corresponding to commanded new working condition as determined by the input data command and concurrently derives an output start enabling signal indicative of this condition, means for supplying the output start enabling signal derived by the direction determining comparator means to the resettable simulated conditions changed counter means as an indication to the logic circuit means comprising a part thereof that a direction determination is to be initiated, and means for supplying the output start enabling signal derived by the direction determining comparator means through the delay means to the process control manipulator means to initiate its operation subsequent to the direction setting thereof by the directional control signals derived by the direction determining control circuit means.

UNITED STATES PATENT OFFICE
CERTIFICATE OF CORRECTION

Patent No. 3,569,815   Dated March 9, 1971

Inventor(s) Lawrence S. McNaughton

It is certified that error appears in the above-identified patent and that said Letters Patent are hereby corrected as shown below:

Column 1, line 35, "tap" should be -- tape --. Column line 1, "processing" should be -- possessing --; line 2, de "post". Column 5, line 19, delete "ti"; line 45, delete "o Column 6, line 6, "32" should be -- 31 --. Column 7, line delete "after" and insert -- before --; line 61,"counter",s occurrence, should read -- count --;line 68, "it" should be -- i Column 8, line 74 (Claim 2), delete "are" (second occurrenc Column 12, line 53, delete "any" (second occurrence). Colu 13, line 24, delete "an".

Signed and sealed this 23rd day of May 1972.

(SEAL)
Attest:

EDWARD M. FLETCHER, JR.          ROBERT GOTTSCHALK
Attesting Officer                Commissioner of Patents